(12) United States Patent  (10) Patent No.: US 6,205,958 B1
Wu  (45) Date of Patent: Mar. 27, 2001

(54) HYDRAULIC AIR-INTAKE GOVERNOR

(76) Inventor: Chih-Pin Wu, P.O. Box No. 6-57, Chung-Ho City, Taipei Hsien 235 (TW)

( * ) Notice: Subject to any disclaimer, the term of this patent is extended or adjusted under 35 U.S.C. 154(b) by 0 days.

(21) Appl. No.: 09/474,270

(22) Filed: Dec. 29, 1999

(51) Int. Cl.⁷ ................................................... F02D 19/00
(52) U.S. Cl. ......................................................... 123/25 R
(58) Field of Search ............................... 123/25 R, 25 A, 123/25 J, 25 L, 25 N, 25 E

(56) References Cited

U.S. PATENT DOCUMENTS

| | | | | |
|---|---|---|---|---|
| 3,955,542 | * | 5/1976 | Skaggs ................................ | 123/25 L |
| 3,965,871 | * | 6/1976 | Morton ................................ | 123/25 R |
| 4,030,456 | * | 6/1977 | Corpus ................................ | 123/25 R |
| 4,374,507 | * | 2/1983 | Protacio et al. ..................... | 123/25 R |

* cited by examiner

Primary Examiner—Willis R. Wolfe
Assistant Examiner—Hyder Ali

(57) ABSTRACT

A hydraulic air-intake governor for connecting to a rear part of a throttle valve in an engine system of a car is provided. Air is guided into a container of the air-intake governor to pass through and be cooled by water filled in the container. Horizontal partitions with holes are provided in the container to define two spaces in which two buoys are separately disposed to float on water. The buoys could close some of the holes on the partitions depending on a water level in the container to control a fixed amount of air that is allowed to pass the partitions for supplying to the engine system, so that air supplied to the engine system for mixing with fuel is always controlled at a fixed amount to enable the engine system to generate constant driving power and operate stably, and thereby eliminates single-cylinder effect or knocking that would adversely affect the operation of the engine system.

3 Claims, 11 Drawing Sheets

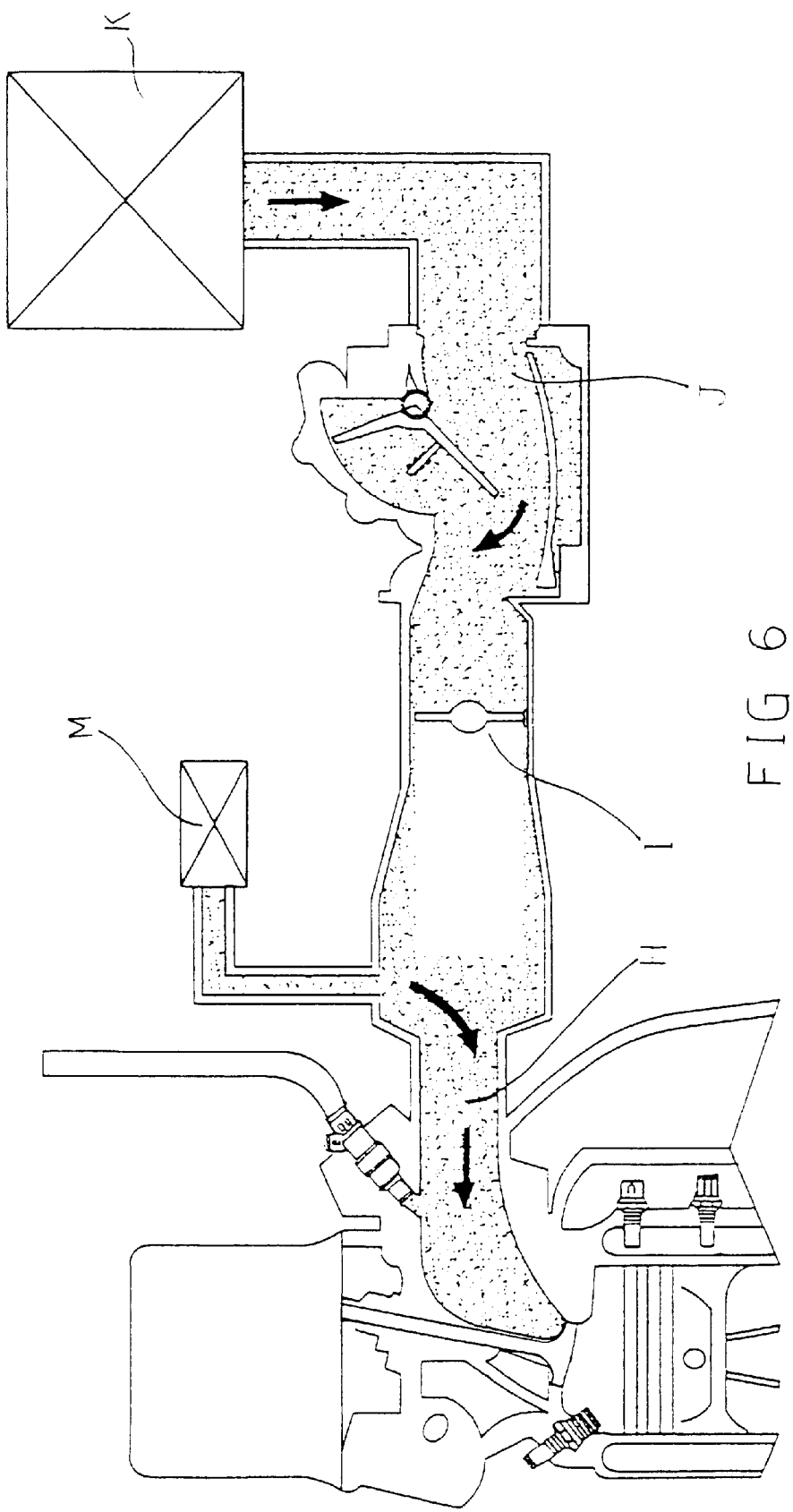

HYDRAULIC AIR-INTAKE GOVERNOR

BACKGROUND OF THE INVENTION (a) Field of the Invention

The present invention relates to a hydraulic air-intake governor for connecting to a rear part of a throttle valve in an engine system of a car in order to regulate the supply of air to the engine system for mixing with fuel in the engine.

(b) Description of the Prior Art

In most general engine systems, fuel and air are mixed to provide fuel air mixture that is ignited to produce gas explosion in the engine, so that a pressure produced by the gas explosion pushes a piston in the engine to generate a driving power.

To maintain a predetermined gas explosive pressure, it is necessary to effectively control the amount of air and fuel guided into the above described engine system. An exceeded air intake while the engine is not in a vacuum state will result in serious single-cylinder effect to cause vibrating car body and unstable engine revolving speed that would have adverse influence on the smooth operation of the engine, particularly when the engine is first started.

It is therefore desirable to develop a means to eliminate the drawbacks existing in the conventional engine systems.

SUMMARY OF THE INVENTION

A primary object of the present invention is to provide a hydraulic air-intake governor that can be externally connected to the engine system by installing the air-intake governor in the trunk of the car, for example, without occupying any space in the engine system, and that is capable of straining air and regulating air amount that can be supplied to and sucked into the engine.

To achieve the above and other objects, the present invention provides a hydraulic air-intake governor that is indirectly connected to a rear part of a throttle valve of the engine system.

The hydraulic air-intake governor mainly includes a container being provided at a head portion with a capped water hole via which water is filled into the container for the same to always maintain a predetermined amount of water therein, an air inlet pipe for guiding external air to a bottom portion of the container, and an air outlet pipe for guiding air moved from the bottom portion to the head portion of the container to move out of the container.

Multiple vertical supports support three horizontal steel partitions in the container, namely, upper, middle, and lower steel partitions. The partitions being provided with holes via which air guided to the bottom portion of the container moves upward to the head portion.

Two buoys having a specific gravity close to that of water separately float on the water in the container between the upper and the middle steel partitions and between the middle and the lower steel partitions. The buoys have a bottom surface of a predetermined area large enough for closing some of the holes on the middle and the lower steel partitions.

A water level gage is connected to and vertically extends in parallel with the container for observation of a water level in the container at any time in order to timely replenish the container with water.

A vapor/air separator is connected to the air outlet pipe extended from the container for sucking vapor and extra air out of the container.

An air-supply regulator is connected downstream to the vapor/air separator with an end thereof indirectly connected to an output end of the vapor/air separator and the other end to an input end of an engine in the engine system. The air-supply regulator includes a substantially tubular body, an air-intake branch pipe provided at a lower end of the tubular body with a beveled upper end extended into the tubular body, an air-exit branch pipe connected to an upper end of the tubular body with a flat lower end thereof extended into the tubular body, and a ball disposed in the tubular body between the beveled upper end of the air-intake branch pipe and the flat lower end of the air-exit branch pipe. Whereby when the engine sucks a large volume of air, the ball is sucked upward to loosely block the flat lower end of the air-exit branch pipe and therefore reduces air supplied to the engine via the air-exit branch pipe; and when the engine sucks a small volume of air, the ball drops to locate above the air-intake branch pipe without blocking the beveled upper end of the air-intake branch pipe to cause any decrease of air flowing into the air-supply regulator via the air-intake branch pipe.

When air is guided to a lower part of the container, which is in a vacuum state, and moves upward to pass through the water in the container, the air is strained and cooled to have a compressed and increased density. The cooled and high-density air will reduce air temperature in the engine for the same to generate increased horsepower.

The buoys selectively close some of the holes provided on the middle and the lower partitions depending on the water level in the container and accordingly control passages in the container available for the air to move upward, so that air that can be supplied to the engine is always maintained at a fixed amount. Since the engine can always have a fixed air amount supplied to it by externally connecting the hydraulic air-intake governor to it, the problems of single-cylinder effect, vibrating car body and unstable revolving speed of engine that would otherwise occur in the conventional engine when the same has exceeded air intake could therefore be eliminated. On the other hand, drawbacks such as air pollution caused by exhaust gas and knocking caused by internally carbon-deposited engine due to insufficient air intake and accordingly incomplete combustion could therefore be eliminated. By observing the water level gage, insufficient water amount in the container can be found earlier to timely replenish the container with water and maintain the normal operation thereof.

Moreover, the hydraulic air-intake governor of the present invention can be indirectly connected to a negative-pressure-intake branch pipe at the rear part of the throttle valve to supplement insufficient air originally supplied to the engine via an engine positive-pressure-intake pipe.

With the air-supply regulator, the ball disposed therein would be sucked upward to block the air supplied to the engine from the present invention when the engine has a large air intake, and the ball would drop to admit air supply to the engine from the present invention when the engine has an insufficient air intake. Therefore, gas explosion in the engine due to exceeded air intake of the engine can be avoided.

The hydraulic air-intake governor of the present invention could be mounted in the trunk of a car through extended connecting hose and would not occupy any space in the original engine system. Air guided to the engine from the hydraulic air-intake governor mounted in the trunk would not be contaminated by exhaust gas and dust to secure the supply of quality air to the engine.

The hydraulic air-intake governor of the present invention can be externally connected to all types of existing engine systems at any time and is therefore not necessary to present in the form of a standard equipment in a new car. Since the present invention employs only a simple water container to control and regulate the amount of air supplied to the engine, it can be manufactured at low cost while produces high economical effect.

The water level gage has a lower end that extends into said container and has an upward extended water inlet pipe connected thereto, so that water in the container would not be completely sucked into the water level gage for the container to keep a desired minimum water level and a compressed vacuum state therein.

The vapor/air separator has a storage cylinder connected thereto for storing vapor and extra air supplied by the container. In the event the engine has insufficient air intake, air stored in the storage cylinder can be duly supplied to the engine in order to increase the revolving speed of the engine. The storage cylinder also prevents improperly large amount of air from entering the engine chamber to avoid extreme explosion or burning in the engine and unnecessary waste and high consumption of fuel.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein

FIG. 6 exemplifies the installation of the preferred embodiment of the hydraulic air-intake governor of the present invention.

DETAILED DESCRIPTION OF THE PREFERRED EMBODIMENTS

Figure 1A:
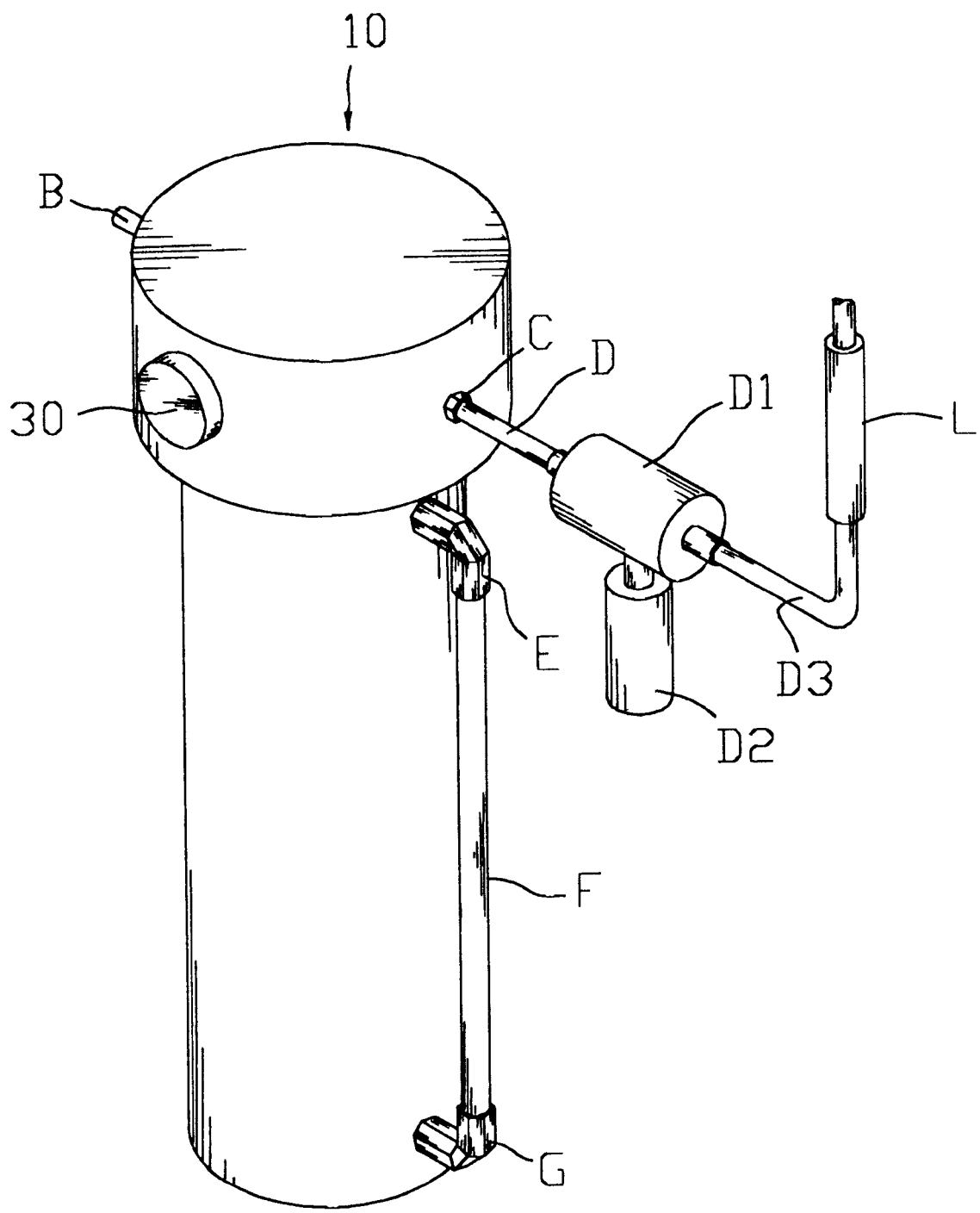
FIG. 1A is a perspective of the hydraulic air-intake governor according to a preferred embodiment of the present invention.
Figure 1B:
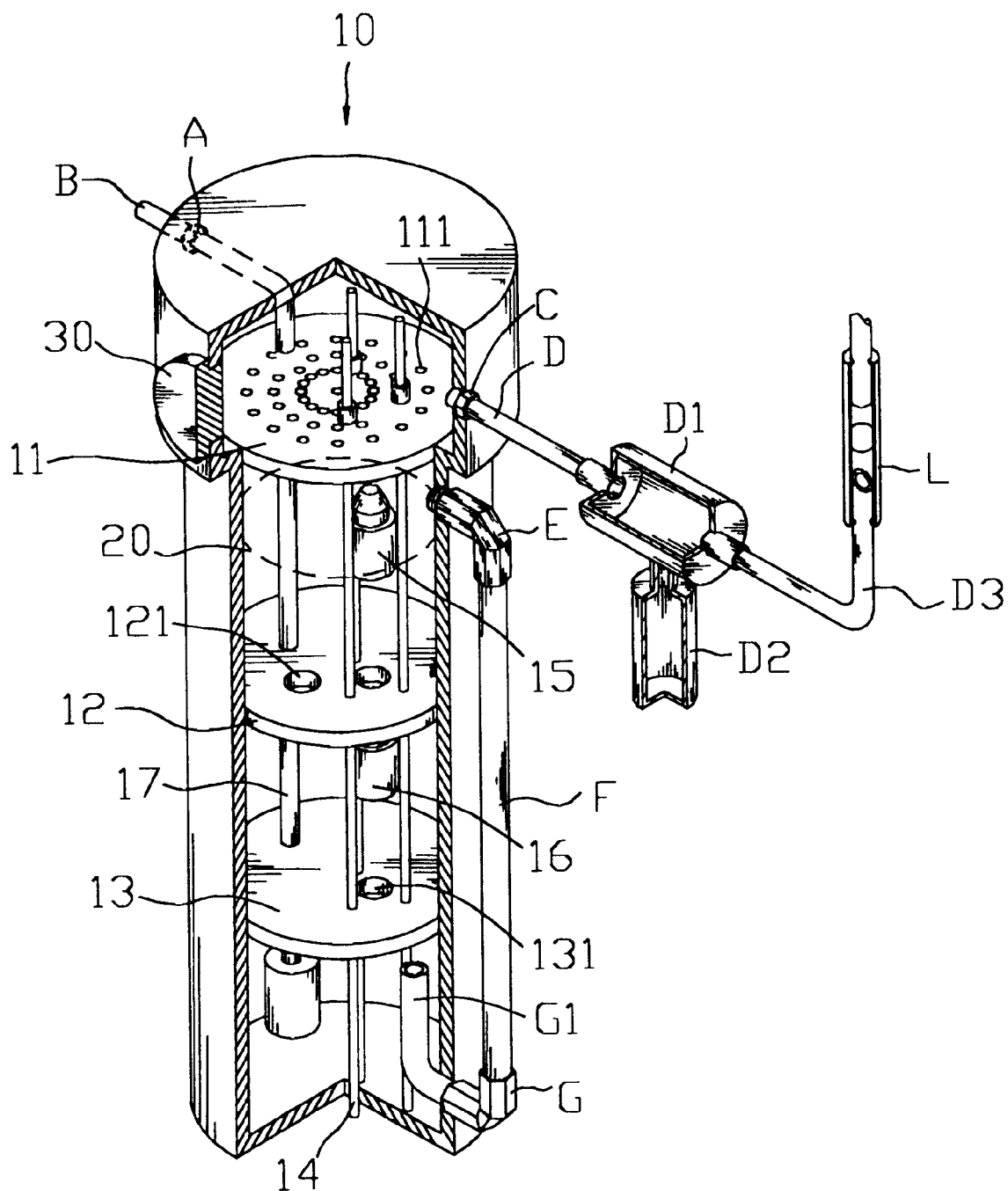
FIG. 1B is a partially cutaway perspective of the hydraulic air-intake governor of FIG. 1A to show an internal structure thereof.
Figure 2A:
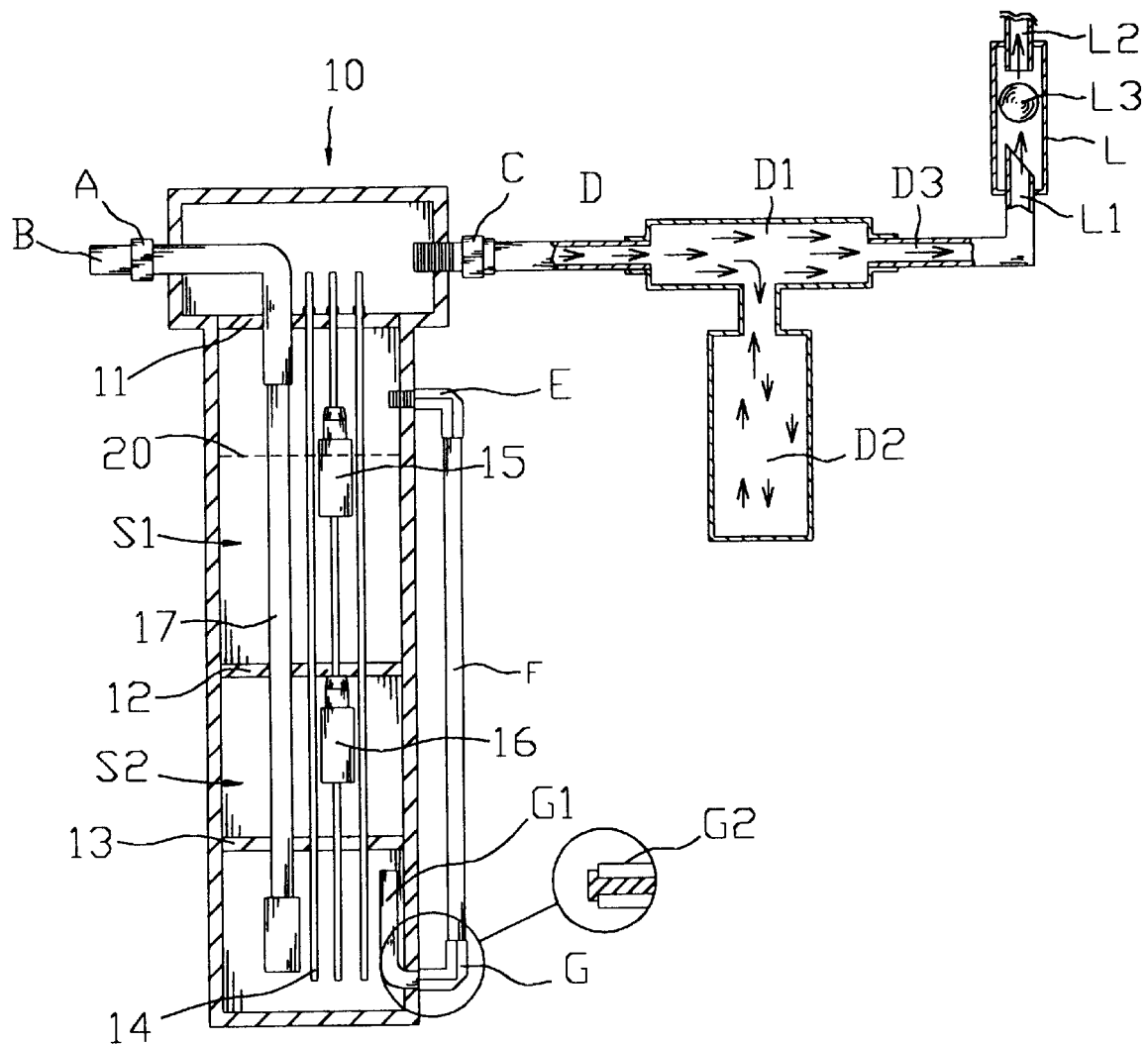
FIGS. 2A and 2B are sectional views of the hydraulic air-intake governor of FIG. 1 showing the internal structure thereof.
Figure 2B:
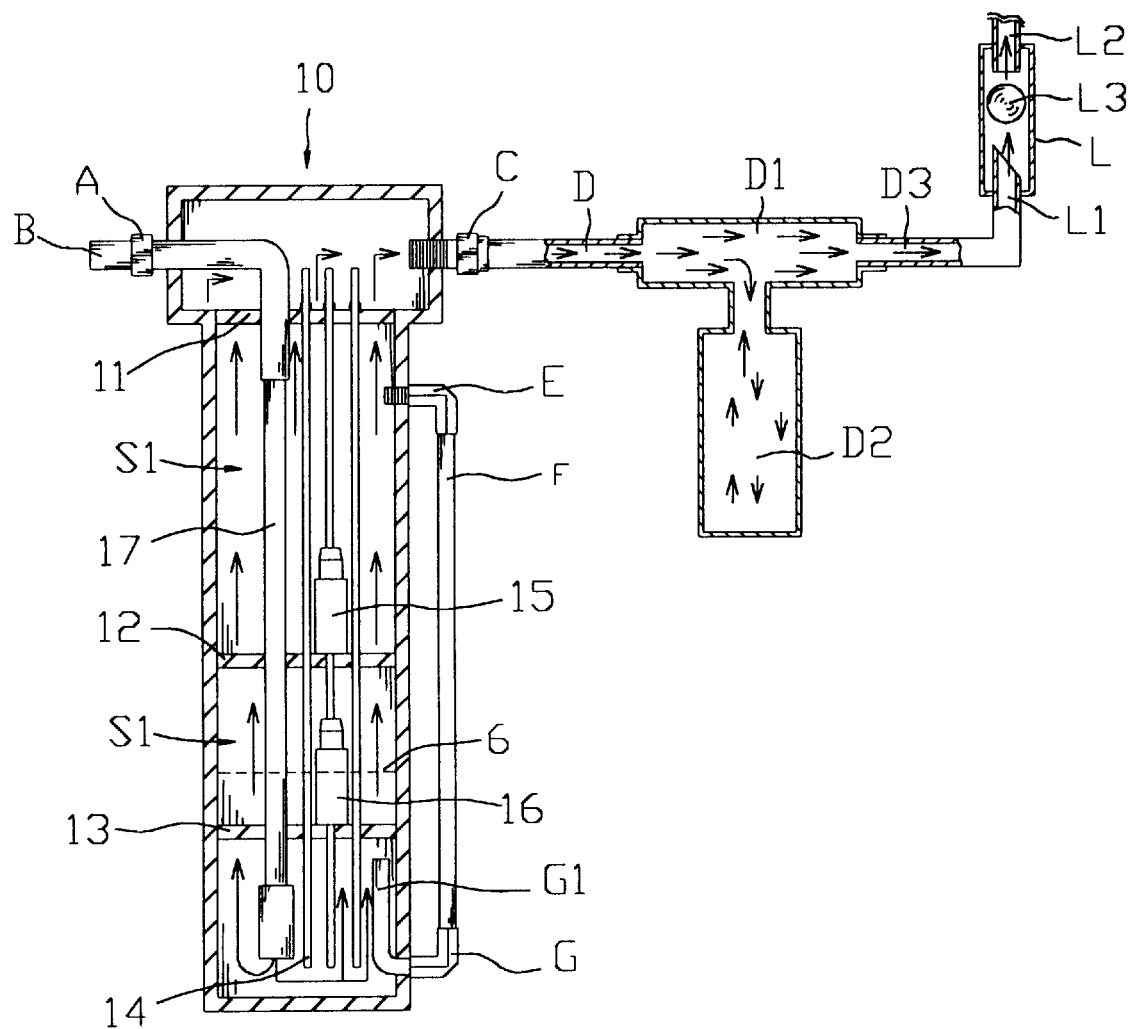
Figure 3A:
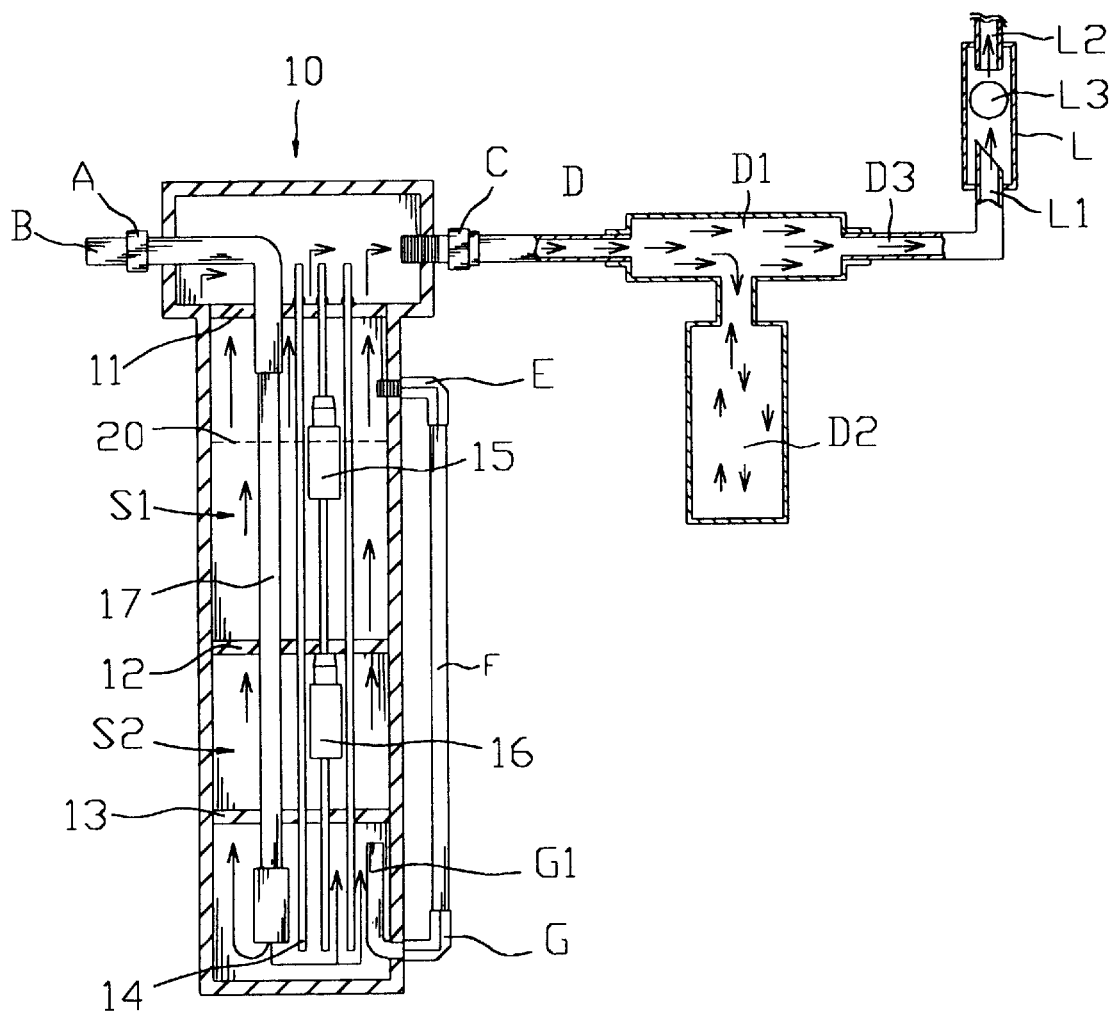
FIG. 3A is a sectional view of the hydraulic air-intake governor of FIG. 1 with a water level therein exceeded a middle steel partition thereof to float a first buoy therein.
Figure 3B:
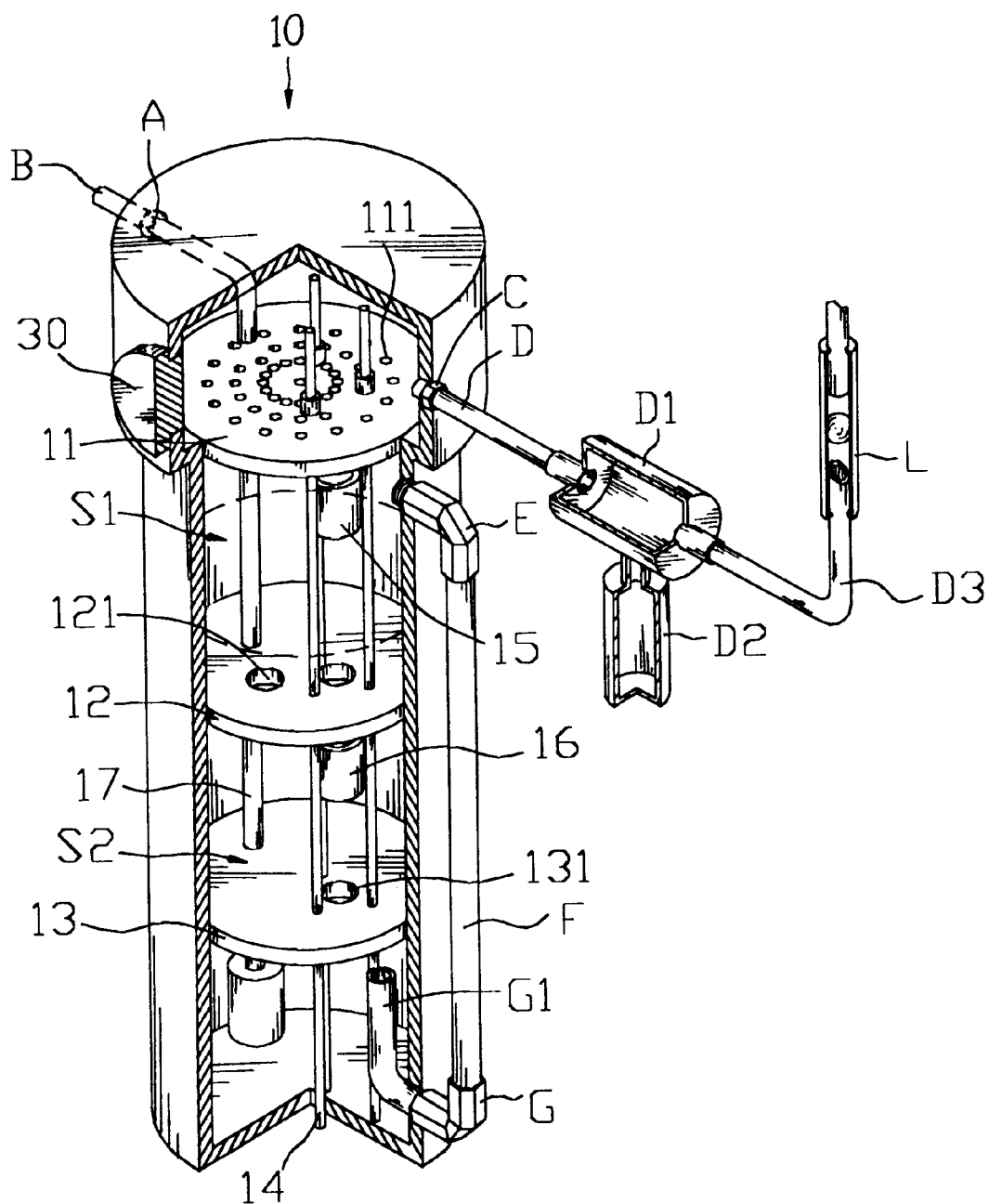
FIG. 3B is a partially cutaway perspective corresponding to FIG. 3A.

Please refer to FIGS. 1A to 2B in which a hydraulic air-intake governor according to a preferred embodiment of the present invention is shown. The hydraulic air-intake governor mainly includes a vertical cylindrical container 10 having a water hole provided at a head portion thereof for filling water into the container 10. The water hole is covered with a cap 30. As can be more clearly seen from FIG. 1B, several supports 14 are provided inside the container 10 to support an upper steel partition 11 having a plurality of holes 111, a middle steel partition 12 having two holes 121, and a lower steel partition 13 having a hole 131. The supports 14 also defines a first and a second vertical space S1, S2 between the upper and the middle steel partitions 11 and 12 and the middle and the lower steel partitions 12 and 13, respectively. A first buoy 15 is disposed in the first vertical space S1 between the upper and the middle steel partitions 11, 12 and has a bottom surface of a predetermined area large enough to close some of the holes 121 on the middle steel partition 12. A second buoy 16 is disposed in the second space vertical space S2 between the middle and the lower steel partitions 12, 13 and has a bottom surface of a predetermined area large enough to close some of the holes 131 on the lower steel partition 13. The first and the second buoys 15, 16 have a specific gravity very close to that of water so that they can freely float in water at any position in the vertical spaces S1, S2 defined by the supports 14.

The container 10 is provided at one side of its head portion with a first connector A, of which an outer end is connected to an air inlet pipe B and an inner end to a downward extended first guide tube 17 that has a lower open end a little above a bottom of the container 10. Air outside the container 10 is supplied into the container 10 via the inlet pipe B and the lower open end of the first guide pipe 17. A water level gage F in the form of a pipe is provided on an outer wall surface of the container 10 at one side generally opposite to the air inlet pipe B, such that the water level gage F extends vertically in parallel with the outer wall of the container 10. A second connector E is connected at one end to an upper end of the water level gage F with another end extending into the container 10. A third connector G is connected at one end to a lower end of the water level gage F with another end extending into the container 10 to connect to an upward extended water inlet pipe G1. The upward extended water inlet pipe G1 connected to the third connector G prevents water 20 inside the container 10 from being completely sucked into the water level gage F when a water level in the container 10 drops close to the bottom of the container 10, so that the container 10 always maintains a vacuum state and a suitable minimum water level.

The third connector G includes a middle section G2 that has a reduced inner diameter and is therefore internally narrower than other parts of the third connector G in front of and behind it. This reduced inner diameter of the third connector G restricts air sucked into the third connector G to a limited amount.

A fourth connector C is provided on the head portion of the container 10 at one side generally opposite to the air inlet pipe B to receive an end of an air outlet pipe D. The other end of the air outlet pipe D is connected to an end of a vapor/air separator D1 for sucking vapor and extra air out of the container 10. The vapor/air separator D1 may be a common vapor/air separating connector and has two end having diameters larger than that of the air outlet pipe D and a second guide tube D3 that is connected to the other end of the vapor/air separator D1. A storage cylinder D2 is communicably connected to one side of the vapor/air separator D1. Vapor and extra air sucked by the vapor/air separator D1 from the container 10 is guided into the storage cylinder D2. In the event normal air supply to the engine is not sufficient, the air stored in the storage cylinder D2 can be supplied to the engine to increase the revolving speed thereof. The storage cylinder D2 also protects the engine from improperly large amount of air intake that will cause extremely explosion or burning in the engine and accordingly unnecessary waste and consumption of fuel. The vapor/air separator D1 is indirectly connected to a throttle valve I (see FIG. 6) via the above-mentioned second guide pipe D3.

An air-supply regulator L is connected downstream to the vapor/air separator D1, such that an end of the air-supply regulator L is indirectly connected to an output end of the vapor/air separator D1 and the other end to an input end of the engine. The air-supply regulator L has a substantially tubular body. An air-intake branch pipe L1 is provided at a lower end of the tubular body with a beveled upper end extended thereinto. An air-exit branch pipe L2 is connected to an upper end of the tubular body with a flat lower end thereof extended thereinto. A ball L3 is disposed in the tubular body between the beveled upper end of the air-intake branch pipe L and the flat lower end of the air-exit branch pipe L2. When the engine sucks a large volume of air, the ball L3 is sucked upward to loosely block the flat lower end of the air-exit branch pipe L2 and therefore reduces air supply to the engine via the air-exit branch pipe L2. And when the engine sucks a small volume of air, the ball L3 drops to locate above the air-intake branch pipe L1. However, due to the beveled upper end, the air-intake branch pipe L1 would not be blocked by the ball L3 to cause any decrease of airflow into the air-supply regulator L via the air-intake branch pipe L1. When the ball L3 blocks the air-exit branch pipe L2, possible gas explosion in the engine due to exceeded air intake can therefore be prevented.

FIGS. 3A to 5B describe in details the manner in which the present invention regulates the air intake of a car engine. Please refer to FIGS. 3A and 3B. When the container 10 of the hydraulic air-intake governor of the present invention is in a vacuum state and has a water level 20 higher than an upper surface of the middle steel partition 12 and sufficient to float the first buoy 15 in the first space S1, air guided into the air inlet pipe B flows through the first guide tube 17 and escapes into the container 10 via the lower open end of the guide tube 17. The air escaped into the container 10 is strained, cooled and compressed to have a higher density when it passes water filled in the container 10. The strained and cooled air then slowly moves upward to pass through the holes 131 and 121 on the lower and the middle steel partitions 13 and 12, respectively, and finally arrives at the head portion of the container 10. When the air moves upward in the container 10, a part of the water in the container 10 evaporates into vapor that mixes with the cooled air. Since the water level 20 in the container 10 is high enough to float the first and the second buoys 15, 16, holes 121, 131 on the middle and the lower steel partitions 12, 13 are not blocked by the first and the second buoys 15, 16, allowing a mixture of the vapor and the air to slowly move upward against the water to pass the holes 131, 121 and thereby supplies a fixed amount of air and vapor into the head portion of the container 10. Thereafter, the cooled and amount-controlled mixture of vapor and air flows through the air outlet pipe D into the vapor/air separator D1. At this point, a part of the air directly goes to the second guide pipe D3 for use by a fuel-air mixing system of the car while the vapor and extra cooled air is stored in the storage cylinder D2 for use later.

Figure 4A:
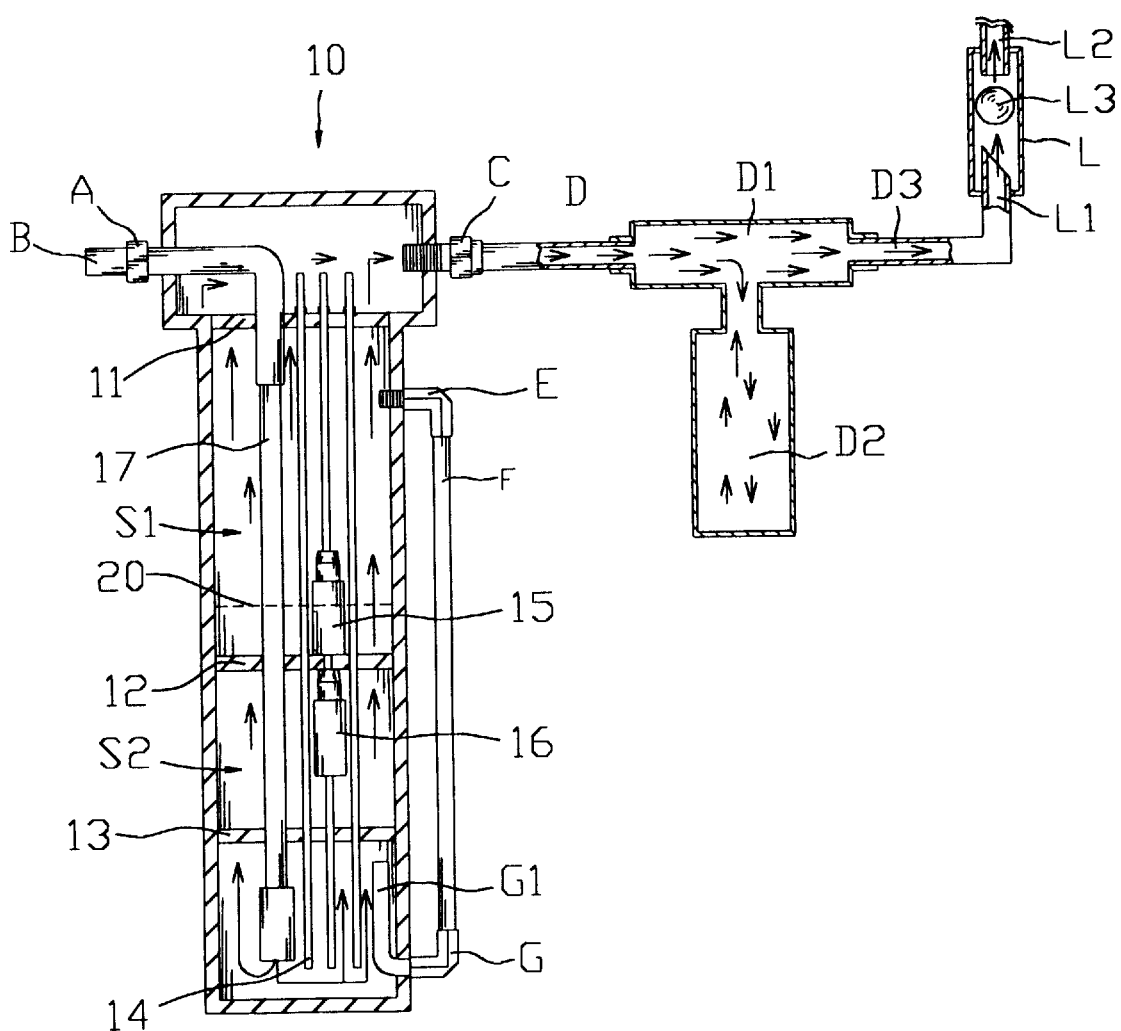
FIG. 4A is similar to FIG. 3A but the water level in the hydraulic air-intake governor is not high enough to float the first buoy.
Figure 4B:
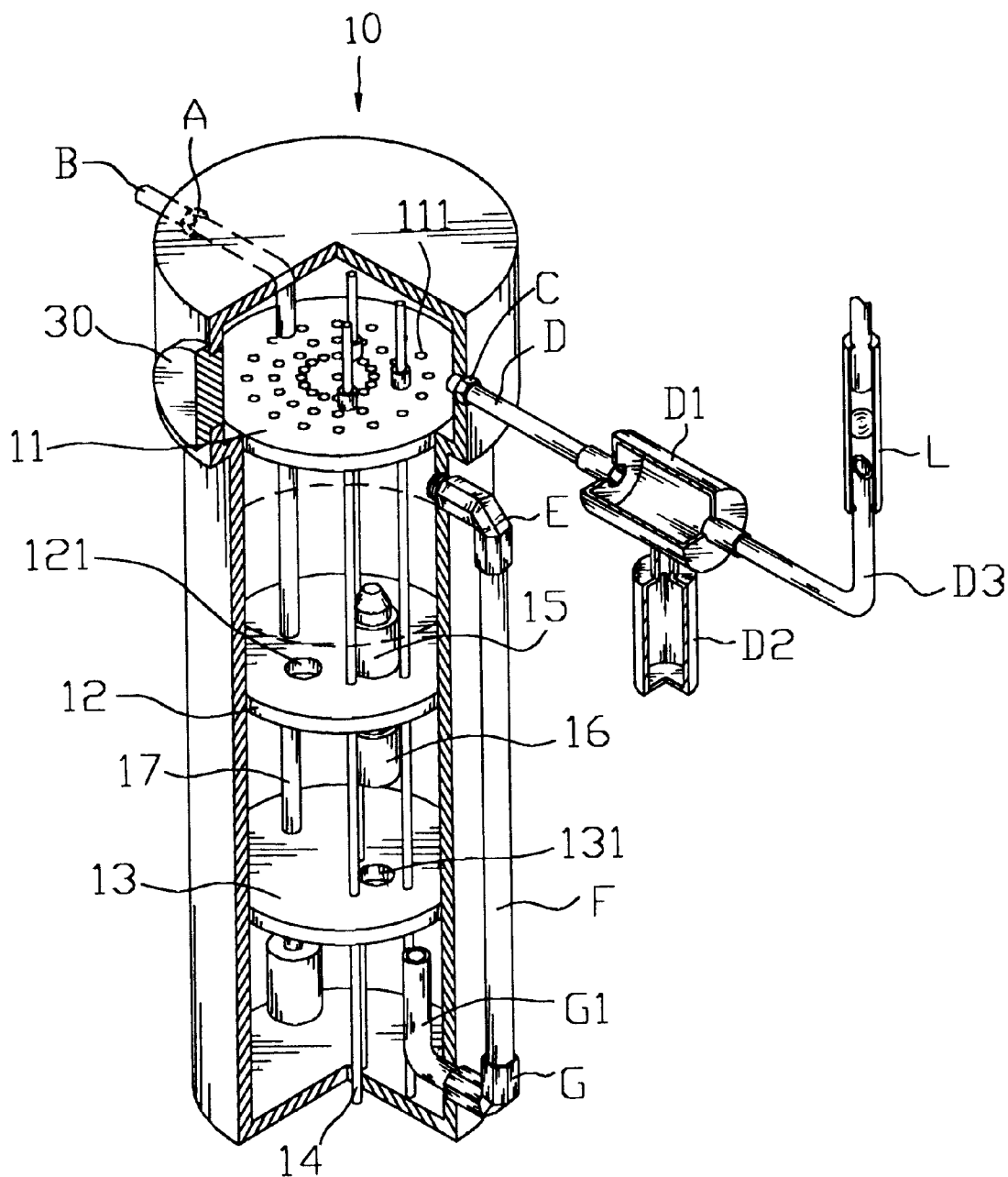
FIG. 4B is a partially cutaway perspective corresponding to FIG. 4A.

Please now refer to FIGS. 4A and 4B. When the container 10 has a water level 20 higher than the middle steel partition 12 but not high enough to float the first buoy 15 in the first space S1, the first buoy 15 would contact with the middle steel partition 12 with its bottom surface pressing against and closing some of the holes 121 on the middle steel partition 12. At this point, the volume of the cooled air that can flow through the partitions is reduced. Although the water level 20 in the container 10 is lowered to allow the cooled air to move upward at an increased speed due to a reduced water resistance in the container 10, air that can be supplied to the head portion of the container 10 is still maintained at the same fixed amount because some of the holes 121 are closed and less cooled air is allowed to pass through the middle steel partition 12.

Figure 5A:
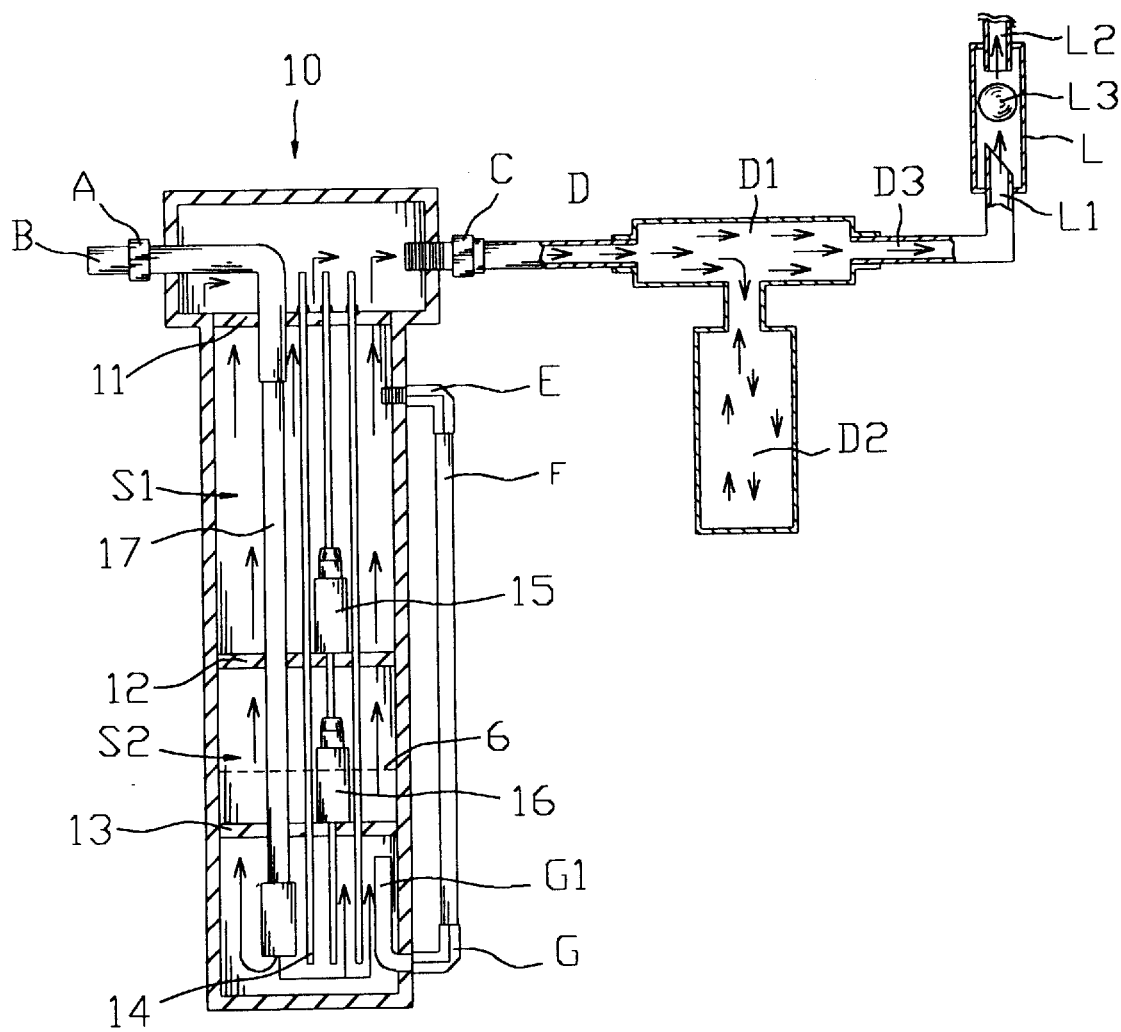
FIG. 5A is similar to FIG. 3A but the water level in the hydraulic air-intake governor is below the middle steel partition and above the lower steel partition and is not high enough to float the first buoy and a second buoy.
Figure 5B:
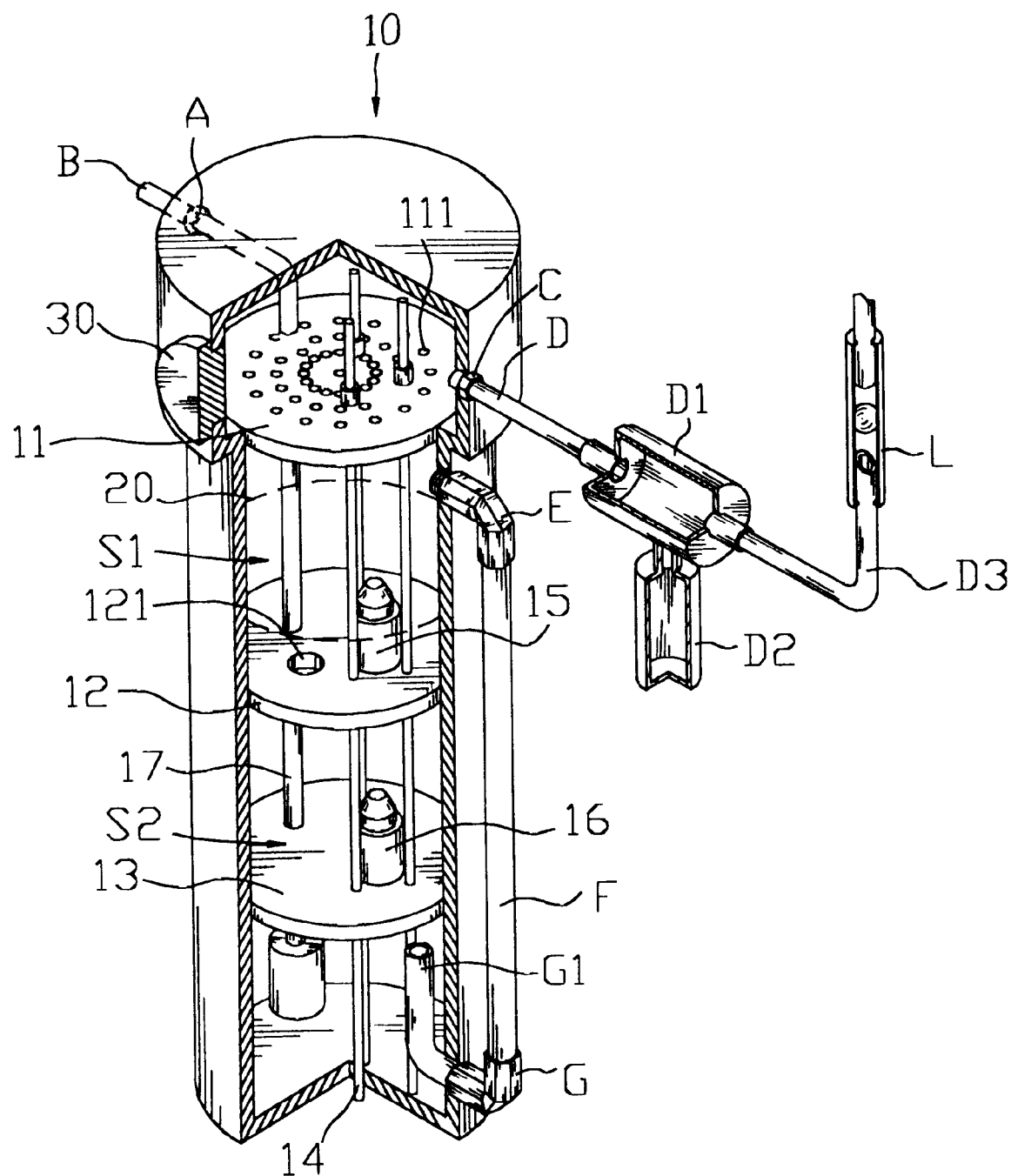
FIG. 5B is a partially cutaway perspective corresponding to FIG. 5A.

The container 10 shown in FIGS. 5A and 5B has a water level 20 lower than the middle steel partition 12 but higher than the lower steel partition 13. However, the water level 20 is not high enough to float both the first and the second buoys 15 and 16 in the first and the second spaces S1 and S2, respectively. At this point, the first and the second buoys 15, 16 will contact with the middle and the lower partitions 12 and 13, respectively, with their bottom surfaces pressing against and closing some of the holes 121 and 131, respectively, to reduce the amount of the cooled air that passes through the partitions 12, 13. Although the water level 20 in the container 10 is further lowered to produce an even reduced water resistance, air that can be supplied to the head portion of the container 10 is still maintained at the same fixed amount because some of the holes 121 and 131 are closed and less cooled air is allowed to pass through the lower and the middle steel partition 13, 12.

With the above-mentioned structure and arrangements of the present invention, the amount of air that can be supplied by the present invention for use by the fuel-air mixing system is always under control to maintain at a fixed amount, no matter how much water there is in the container 10. This fixed amount of air supply enables the maintenance of a desired degree of gas explosion in the engine to provide stable driving power and thereby improves the drawbacks existing in the prior art.

FIG. 6 exemplifies the installation of the above-described hydraulic air-intake governor of the present invention. In the drawing, letter "M" represents the hydraulic air-intake governor of the present invention that may be connected to a negative-pressure-intake branch pipe H forming a rear part of a throttle valve I. The air supplied by the hydraulic air-intake governor M timely meets another flow of air passing through an air filter K and an air meter J and then mixes with fuel to supplement insufficient air intake originally supplied via a positive-pressure-intake pipe to the engine.

The following are some of the advantages of the hydraulic air-intake governor of the present invention:

1. Air passing through the water 20 in the container 10 is strained, cooled and compressed to have an increased density. The cooled air reduces the air temperature in the engine for the engine to generate enhanced horsepower.
2. When the water level 20 in the container 10 lowers due to evaporation of water into vapor and mixing of vapor with air in the container 10, the air supplied by the hydraulic air intake governor is still maintained at a fixed amount without change.
3. The water level gage F provided at one outer side of the container 10 allows observation of water level inside the container 10 at any time, so that timely replenishment of the container 10 with water to maintain normal functioning of the hydraulic air intake governor is possible.
4. The vapor/air separator D1 and the storage cylinder D2 connected to the container 10 together enable timely supply of air to the engine when the engine has insufficient air intake, so as to increase the revolving speed of the engine. The storage cylinder D2 also protects the engine from improperly large amount of air intake that will cause extreme gas explosion or burning in the engine and results in unnecessary waste and high consumption of fuel.

5. The air-supply regulator L regulates the amount of air being supplied to the engine to prevent gas explosion in the engine due to exceeded suction of air into the engine.

6. The hydraulic air intake governor is designed for externally connecting to all types of existing engine systems and can therefore be utilized in a wide range. Moreover, the hydraulic air intake governor has very simple structure and is therefore a highly economical and practical product for use.

What is claimed is:

1. A hydraulic air-intake governor for installed in a car near a throttle valve of an engine system of the car, comprising:

a container being provided at a head portion with a capped water hole via which water is filled into said container, an air inlet pipe for guiding external air to a bottom portion of said container, and an air outlet pipe for guiding air moved from the bottom portion to the head portion of said container to move out of said container; and said container always containing a predetermined amount of water therein;

vertical supports supporting three horizontal steel partitions in said container, namely, upper, middle, and lower steel partitions, said partitions being provided with holes via which air guided to the bottom portion of said container moves upward to the head portion;

two buoys having a specific gravity close to that of water to separately float on the water between said upper and said middle steel partitions and between said middle and said lower steel partitions, said buoys having a bottom surface of a predetermined area large enough for closing some of said holes on said middle and said lower steel partitions;

a water level gage connected to and vertically extended in parallel with said container for observation of a water level in said container at any time in order to timely replenish said container with water;

a vapor/air separator connected to said air outlet pipe extended from said container for sucking vapor and extra air out of said container; and an air-supply regulator connected downstream to said vapor/air separator with an end thereof indirectly connected to an output end of said vapor/air separator and the other end to an input end of an engine of said engine system, said air-supply regulator including a substantially tubular body, an air-intake branch pipe provided at a lower end of said tubular body with a beveled upper end extended into said tubular body, an air-exit branch pipe connected to an upper end of said tubular body with a flat lower end thereof extended into said tubular body, and a ball disposed in said tubular body between said beveled upper end of said air-intake branch pipe and said flat lower end of said air-exit branch pipe; whereby when said engine sucks a large volume of air, said ball is sucked upward to loosely block said flat lower end of said air-exit branch pipe and therefore reduces air supplied to said engine via said air-exit branch pipe, and when said engine sucks a small volume of air, said ball drops to locate above said air-intake branch pipe without blocking said beveled upper end of said air-intake branch pipe to cause any decrease of air flowing into said air-supply regulator via said air-intake branch pipe.

2. A hydraulic air-intake governor as claimed in claim 1, wherein said water level gage has a lower end that extends into said container and has an upward extended water inlet pipe connected thereto.

3. A hydraulic air-intake governor as claimed in claim 1, wherein said vapor/air separator has a storage cylinder connected thereto for storing vapor and extra air supplied by said container.

* * * * *